United States Patent
Giblin

(10) Patent No.: US 11,228,571 B2
(45) Date of Patent: Jan. 18, 2022

(54) POLICY-BASED TOPIC-LEVEL ENCRYPTION FOR MESSAGE QUEUES

(71) Applicant: International Business Machines Corporation, Armonk, NY (US)

(72) Inventor: Christopher J. Giblin, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 16/782,400

(22) Filed: Feb. 5, 2020

(65) Prior Publication Data

US 2021/0243168 A1   Aug. 5, 2021

(51) Int. Cl.
| | | |
|---|---|---|
| *H04L 29/06* | (2006.01) | |
| *H04L 9/08* | (2006.01) | |
| *H04L 9/14* | (2006.01) | |
| *G06F 21/60* | (2013.01) | |
| *H04L 12/58* | (2006.01) | |

(52) U.S. Cl.
CPC .......... *H04L 63/0428* (2013.01); *G06F 21/60* (2013.01); *H04L 9/083* (2013.01); *H04L 9/0822* (2013.01); *H04L 9/14* (2013.01); *H04L 63/123* (2013.01); *H04L 51/16* (2013.01); *H04L 63/045* (2013.01)

(58) Field of Classification Search
CPC ... H04L 63/0428; H04L 63/123; H04L 9/083; H04L 9/14; H04L 9/0822; H04L 63/045; H04L 51/16; G06F 21/60
See application file for complete search history.

(56) References Cited

U.S. PATENT DOCUMENTS

| | | | |
|---|---|---|---|
| 9,118,633 B2 | 8/2015 | Dixon | |
| 10,313,135 B2 | 6/2019 | Lord | |
| 2010/0067695 A1* | 3/2010 | Liao | G06Q 10/06 380/255 |
| 2013/0198522 A1* | 8/2013 | Kohno | G06F 21/62 713/182 |
| 2014/0282844 A1 | 9/2014 | Devetter | |
| 2015/0249681 A1* | 9/2015 | Zhang | G06F 40/205 726/1 |
| 2016/0087922 A1 | 3/2016 | Kesavan | |
| 2018/0076954 A1 | 3/2018 | Mesiano | |
| 2018/0254892 A1* | 9/2018 | Egorov | H04L 9/0819 |

(Continued)

FOREIGN PATENT DOCUMENTS

CN   101567780 B   5/2011

OTHER PUBLICATIONS

"Patent Cooperation Treaty PCT International Search Report", Applicant's file reference P201904294, International application No. PCT/IB2021/050141, International filing date Jan. 10, 2021, Priority Date Feb. 5, 2020, 6 pages.

(Continued)

*Primary Examiner* — Henry Tsang
(74) *Attorney, Agent, or Firm* — Stephen R. Yoder

(57) ABSTRACT

A targeted, topic-based encryption in a publish-subscribe message queue. Topic-based encryption driven by encryption policies for both storing and receiving messages uses activity tracking and logging to ensure confidentiality of certain topics associated with stored encrypted messages. Authentication of both publisher and consumer ensure encryption and decryption keys are used in confidence.

19 Claims, 6 Drawing Sheets

(56) References Cited

U.S. PATENT DOCUMENTS

2018/0262592 A1    9/2018  Zandi
2019/0044939 A1*   2/2019  Smith ................. H04L 63/0428
2019/0394175 A1*  12/2019  Zhang .................... H04L 9/085

OTHER PUBLICATIONS

IBM, "Securing data at rest for Apache Kafka", printed on Jan. 22, 2020, 2 pages, <https://www.ibm.com/support/knowledgecenter/SSWTQQ_1.2.0/com.ibm.swg.ba.cognos.trade_analytics.1.2.0.doc/t_trd_securekafka.html>.

Saly, Hendrik, "Transparent End-to-End security for Apache Kafka—Part 1", Oct. 11, 2016, 9 pages, <https://blog.codecentric.de/en/2016/10/transparent-end-end-security-apache-kafka-part-1>.

* cited by examiner

POLICY-BASED TOPIC-LEVEL ENCRYPTION FOR MESSAGE QUEUES

BACKGROUND

The present invention relates generally to message queuing systems and more specifically to the handling of messages in a message queuing system in a secure way.

Managing message and information exchange within enterprises, across enterprises, from enterprises to consumers, as well as from consumer to consumer is one of the core competencies of information technology. Messaging systems have been widely used for decades to store, forward and distribute data as messages. Recently, messaging systems such as Kafka are also being regarded as a form of database. Simultaneous to this development, these messaging systems are increasingly instantiated in cloud computing systems. (Note: the term "KAFKA" may be subject to trademark rights in various jurisdictions throughout the world and are used here only in reference to the products or services properly denominated by the marks to the extent that such trademark rights may exist.)

It is known for a secure key management and data transmission system to include a transition system, a data consumer network device, a user network device, and a data transmission network. The transmission management system is configured to receive user-specific data from the user network device via the data transmission network and receive a request for a service corresponding to processing the user-specific data according to a proprietary process provided by the data consumer network device.

Additionally, it is known for a system for propagating network configuration policies to use a publish/subscribe messaging system. During operation, the system receives, through the publish/subscribe messaging system, one or more messages containing a first representation of a configuration policy from a policy server.

SUMMARY

In one aspect of the present invention, a method, a computer program product, and a system includes: (i) determining a first topic associated with a first message requires a first encryption level by reference to a topic-based encryption policy; (ii) providing to a user an encryption key for encrypting the first message according to the first encryption level to produce a first encrypted message; (iii) storing the first encrypted message in a message queuing system according to the first topic; (iv) receiving from a consumer a request for messages associated with the first topic including the first encrypted message; (v) identifying a decryption key corresponding to the encrypted message according to the topic-based encryption policy with reference to the first topic; and (vi) sending to the consumer the first encrypted message for decryption by the consumer using the decryption key.

According to another aspect of the present invention, a computer-implemented method for a targeted, policy-based encryption in a publish/subscribe message queueing system may be provided. The method may comprise receiving an encrypted message by a message queueing system, wherein the message has been encrypted by referring to an encryption policy system and a key management system storing a topic-related encryption key, storing the received topic-related encrypted message, and sending the encrypted message based on a subscription to the topic.

According to yet another aspect of the present invention, a system for a targeted, policy-based encryption in a publish-subscribe message queue may be provided. The system may comprise a message queueing system adapted for receiving an encrypted message, wherein the message has been encrypted by referring to an encryption policy system and a key management system storing a topic-related encryption key, means for storing the received topic-related encrypted message, and means for sending the encrypted message based on a subscription to the topic.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the present invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
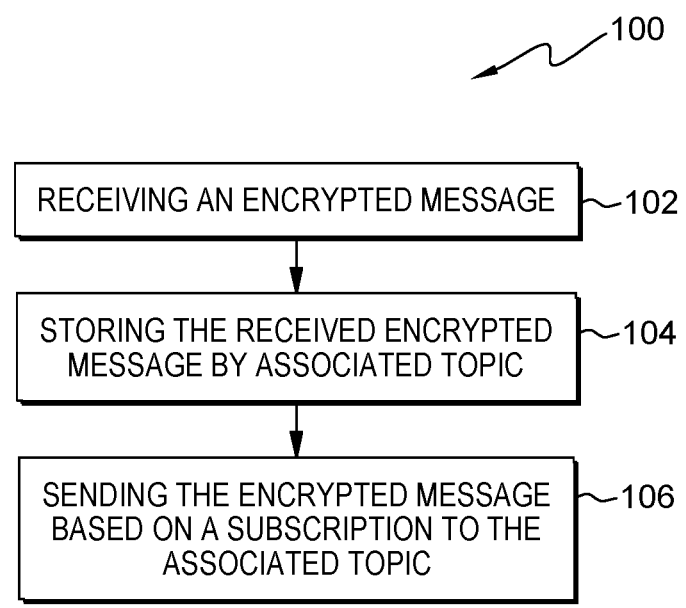

Some embodiments of the present invention will be described, by way of example only, and with reference to the following drawings:

FIG. 1 is a flowchart of a first-embodiment method for a targeted, policy-based encryption in a publish-subscribe message queue.

Figure 2:
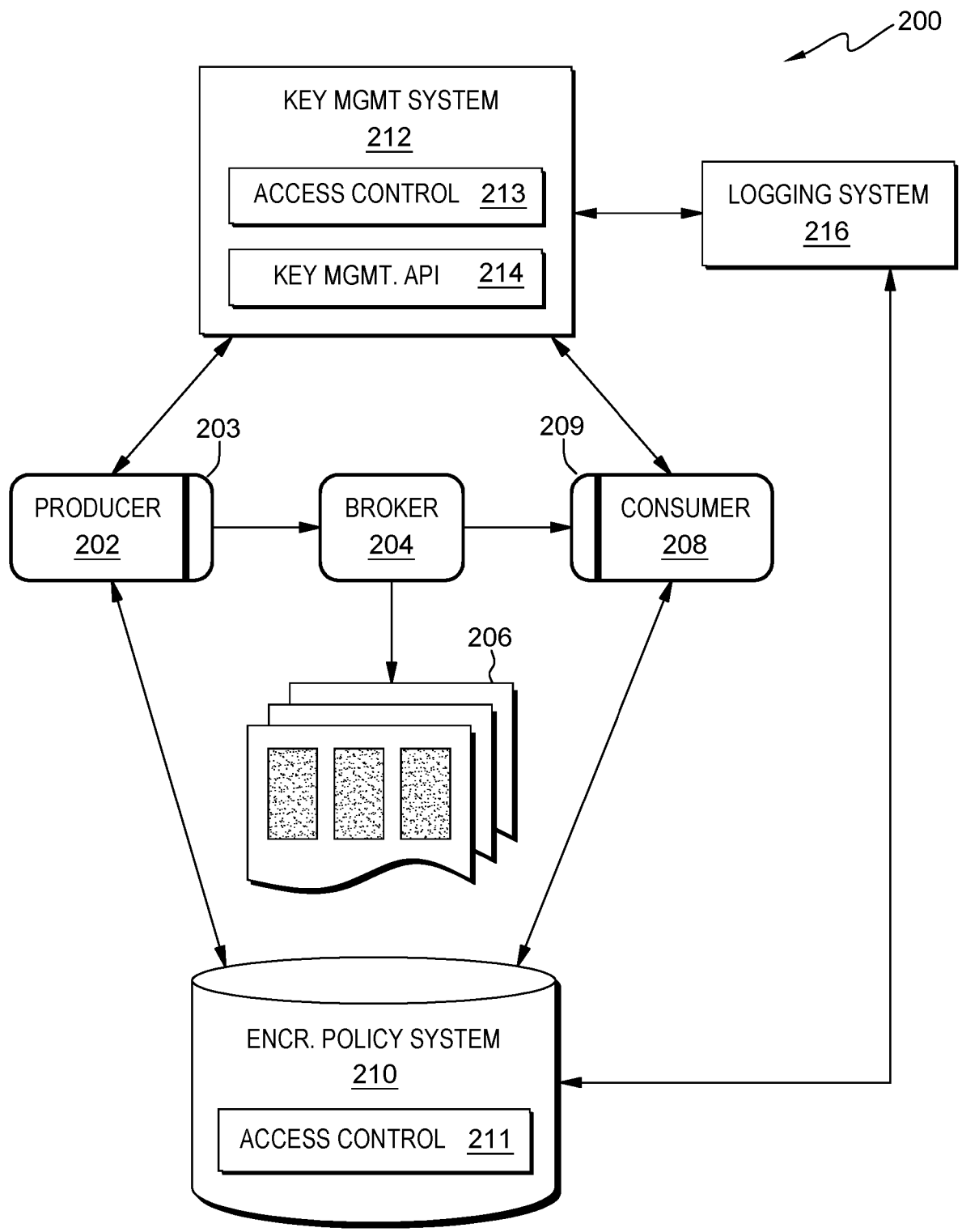

FIG. 2 is a schematic view of a first-embodiment system supporting the first-embodiment method of FIG. 1.

Figure 3:
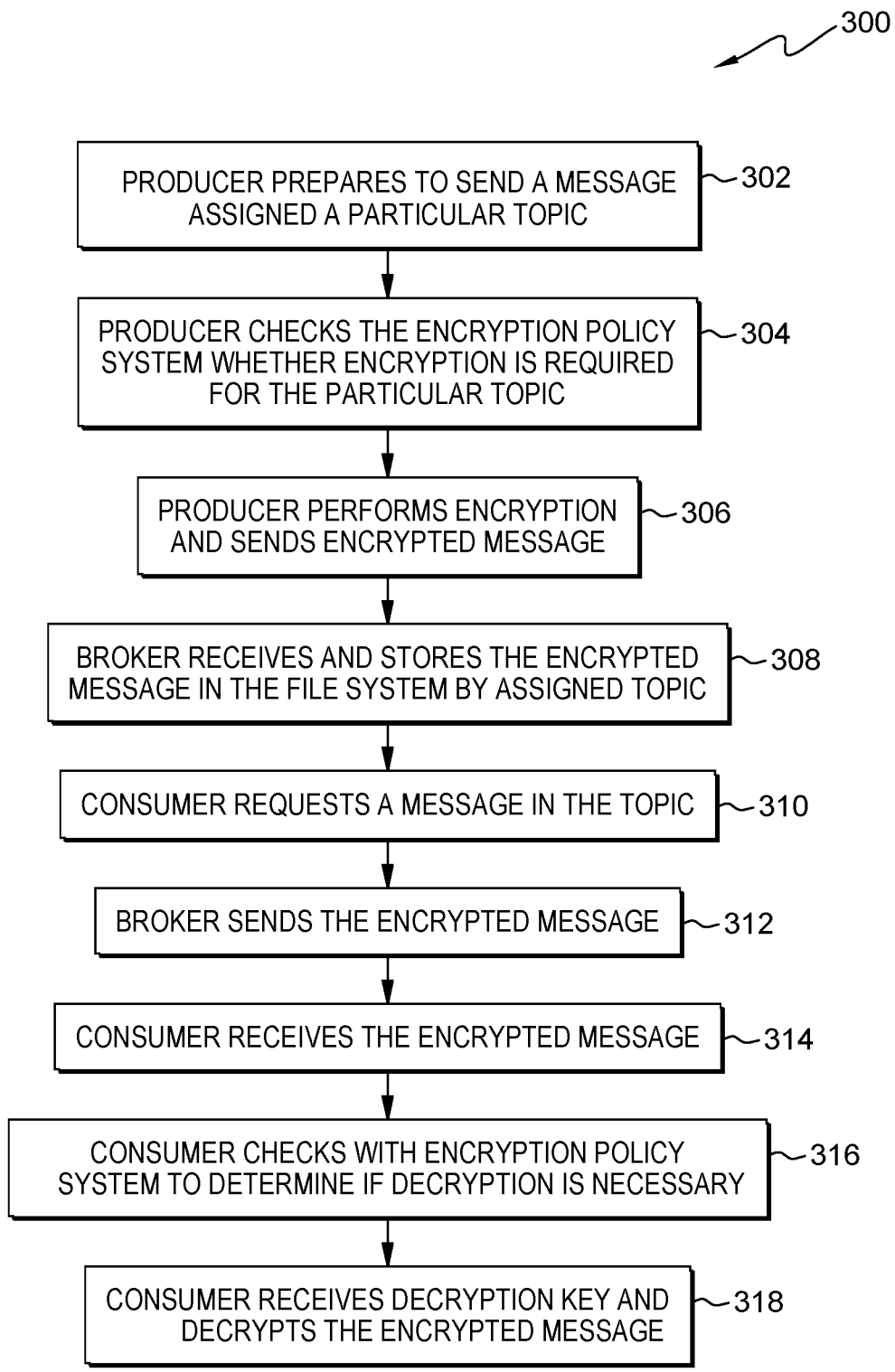

FIG. 3 is a flowchart of activities to implement at least portions of the first-embodiment method using the first-embodiment system of FIG. 2.

Figure 4:
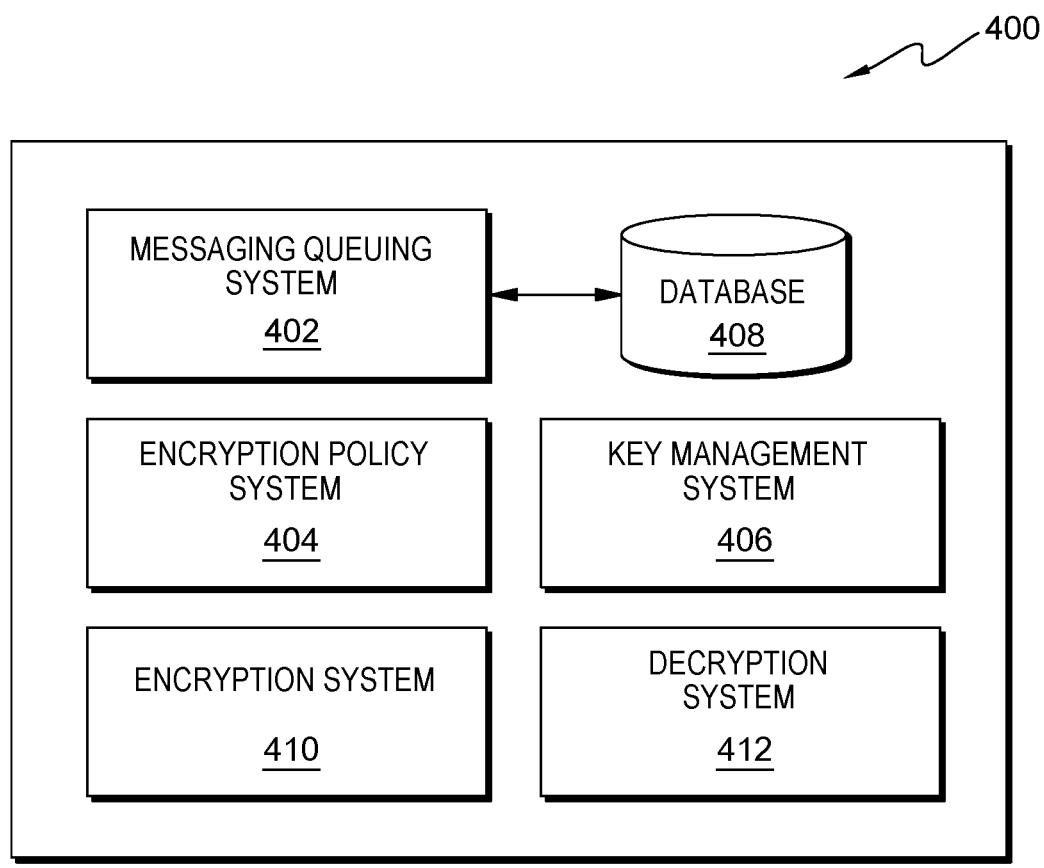

FIG. 4 is a schematic view of a machine logic (for example, software) portion of the first-embodiment system for a targeted, policy-based encryption in a publish/subscribe message queue.

Figure 5:
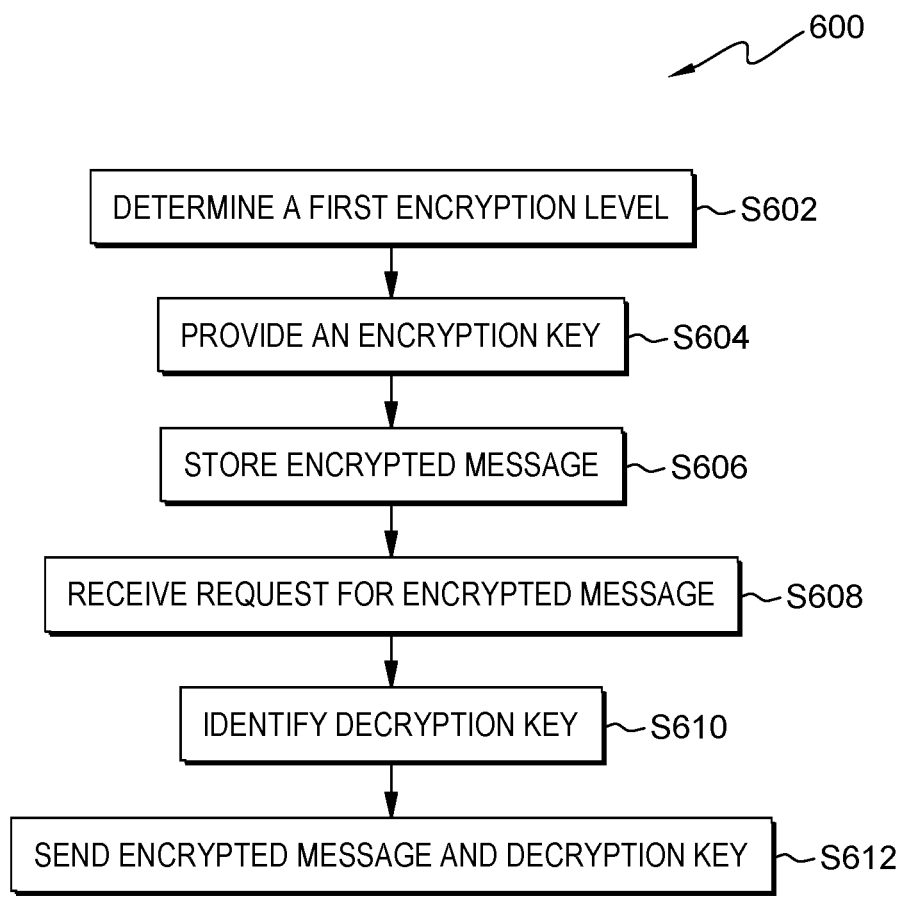

FIG. 5 is a flowchart of a second embodiment method for a targeted, policy-based encryption in a publish-subscribe message queue.

Figure 6:
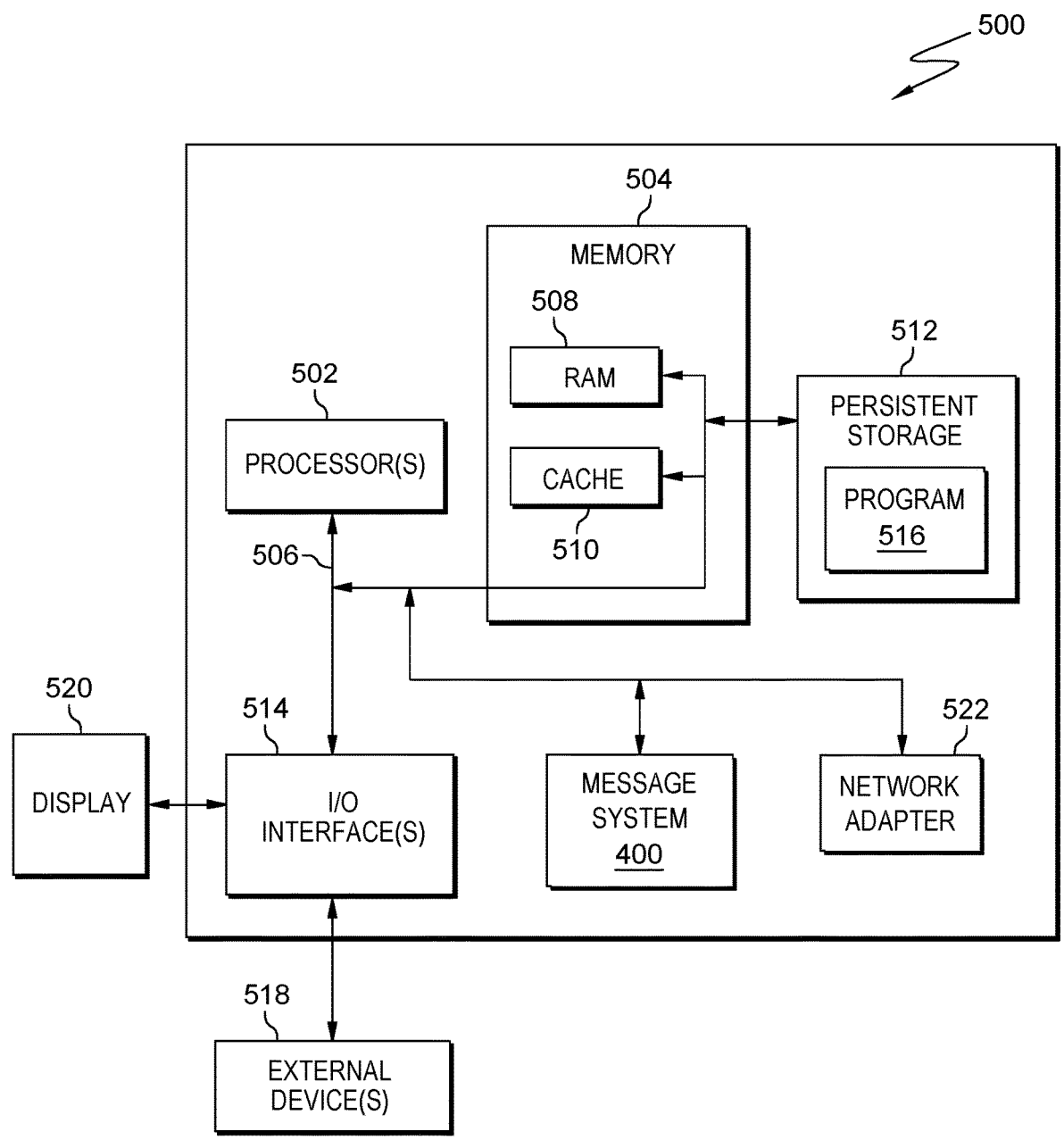

FIG. 6 is a schematic view of a computing system according to the present invention.

DETAILED DESCRIPTION

A targeted, topic-based encryption in a publish-subscribe message queue. Topic-based encryption driven by encryption policies for both storing and receiving messages uses activity tracking and logging to ensure confidentiality of certain topics associated with stored encrypted messages. Authentication of both publisher and consumer ensure encryption and decryption keys are used in confidence.

When messaging systems move highly sensitive data, such as personal information or financial data, encryption of the data at the messaging server may often be required due to regulatory requirements, privacy policies, and/or best practices.

Some messaging systems store all the data that is intended to be forwarded through the messaging server. For this and other reasons, these messaging systems resemble databases. For this type of messaging system, the need for encrypted storage is heightened because a complete set of sensitive information may be present and stored on the messaging server. If not encrypted, the entire sensitive data set could be exposed to non-allowed access.

Some messaging systems may support native encryption of data stored on the messaging server. However, even if messaging systems support encrypted storage on the server, the original producer of the data is not necessarily in control of the means of the encryption and particularly not in control of the encryption keys.

Often, encryption-at-rest is addressed with disk or file system encryption on the messaging server. While these approaches may prevent exposure when a disk is lost or stolen, they typically do not prevent access to the decrypted data when users have read and access permission to all files on the messaging server. Hence, the file system would decrypt data for such users as they possess read permission. To prevent this so-called "sysadmin attack," best security practice mandates that sensitive data be encrypted, i.e., that the database or application level in the corresponding decryption keys are not accessible to system administrators.

In the context of this description, the following conventions, terms and/or expressions may be used:

The term "policy-based encryption" may denote that a repository of rules may be available in, e.g., and encryption policy database. By referring to the encryption policy database and requesting a flag, the requirement for an encryption of messages relating to a specific topic in a message queue, the encryption policy database may inform the requestor that messages relating to the selected topic are encrypted or have to be encrypted. It may also be noted that "encrypting a message" may refer to the process of making a message unreadable as plain text. It may only be understandable after it may have been decrypted.

It may also be noted that the term "encryption" may be understood in a broad sense, namely, also comprising other cryptographic operations such as digital signatures and MACs which provide message integrity and non-repudiation properties.

The term "message queue" (or messaging queue) may denote a data storage organization facilitating inter-process communication, or for inter-thread communication within the same process. They may use a queue for the messages, such as a defined sequence of messages. This way, an asynchronous communication protocol may be established. This means that the sender and the receiver of the message do not need to interact with the message queue at the same time. Messages placed onto the queue by a sender may be stored onto the queue and received and/or a receiver may retrieve them. A larger plurality of different commercial message queuing systems from different companies or as open source implementations may exist. Sometimes the message queuing system may also be denoted as message broker.

Hence, message queuing may allow a messaging pattern in which senders of messages, denoted herein as publishers or message producers, do not program the message to be sent directly to a specific receiver, denoted herein as message consumer. In the context of this description, the terms "producer" and "consumer" may refer to a human user operating a computer or to a computer program operating according to program instructions to produce, encrypt, subscribe, receive, and/or decrypt messages of the message queuing system. Instead, the published messages may be categorized into different classes or topics, without knowledge of any subscriber. Subscribers may express interest in one or more of those message classes and may only receive those messages that are of their interest, such as a particular topic of interest, without any knowledge of which message producer may have generated the message.

The term "encrypted message" may denote data not being present in clear text but encoded by an encryption key. Various methods for encryption are known. The proposed concept may be independent of the selected encryption method. The encrypted message may only be read in clear text after a decryption.

The term "encryption policy system" may denote a policy database or repository of information defining cryptographic operations and associated key material to be applied to messages, e.g., send a given topic of the message queuing system. Specifically for each topic to be protected against unauthorized access a record may exist detailing at least some of the following information: (i) message server address(es); (ii) topic name; (iii) topic identifier; (iv) encryption algorithms(s); (v) encryption/decryption step(s); (vi) cipher suite (e.g., respective application programming interfaces); (vii) key management service; (viii) service address; (ix) key identifier; and/or (x) optional initialization information for the encryption/decryption.

The term "key management system" may denote a storage system for pairs of encryption and decryption keys—in particular, for an asymmetric encryption—or for symmetric encryption/decryption for messages. The key management system may provide a specific encryption key based on a selected rule of the encryption policy system (on the message sender side) or based on a selected topic (on the message consumer side).

The term "subscription" may denote an indicated interest to messages of a specified class or topic. The message consumer having the subscription may receive messages stored in a message queue by topic or class.

The term "topic" may denote a theme or a headline for a plurality of messages. Topics may be organized according to different rules, e.g., relating to the same or similar content, relating to a specific time period, and/or relating to an author.

The term "Kafka" (or Kafka system)—in particular in version 0.9.0 or higher—may denote the known open-source stream-processing software platform owned by the Apache Software Foundation. Kafka aims at providing a unified, high-throughput, low-latency platform for handling real-time data feeds. It may also be used as a message queuing system organizing received messages in topics and storing them in a related database. Besides the Kafka system, the proposed method and the related system may also be implemented with other message queuing systems. (Note: the terms "KAFKA," "APACHE," and "APACHE SOFTWARE FOUNDATION" may be subject to trademark rights in various jurisdictions throughout the world and are used here only in reference to the products or services properly denominated by the marks to the extent that such trademark rights may exist.)

The term "message producer" may denote the originator (or the originator operated system) of a message. The originator may also be denoted as publisher.

The term "message consumer" may denote a receiver of the message. It may be noted that the terms "(message) producer" and "(message) consumer" may relate to the Kafka system.

Some embodiments of the present invention recognize the following facts, potential problems and/or potential areas for improvement with respect to the current state of the art: (i) conventional systems propagating network configuration policies do not allow an end-to-end encryption of topic-related messages in message broker systems so sysadmin attacks may still be unavoidable and, therefore, there may be a need to overcome these deficiencies in traditional message queuing systems, in particular in terms of securing data within the message queuing system; (ii) end-to-end data protection—from the producer to the consumer—may be guaranteed without decrypting messages transmitted from a producer to the message queuing system in that messages stored in databases on a message queuing server stay encrypted and are stored in encrypted form in the database so no message requiring encryption according to a security policy and received by the message queuing system will ever be accessible by an unauthorized personnel (or unauthorized systems); (iii) the combination of the message queuing system, the encryption policy system, and a related key management system and/or service may allow unique control of security aspects of topic-related messages in a publish/subscribe environment; (iv) administrators of the message queuing server may be excluded from accessing encrypted messages in specified topics in the database of the message queuing system according to the encryption policy system which may exclude the administrator from read permission to topics in the database; (v) the control is not simply delegated to the message producer but controlled by the encryption policy system which may define rules for message producers and message receivers independently in such a way that the message producer may simply request an encryption key from a key management system or service relating—but not necessarily being identical—to the encryption policy system and the message may then be encrypted on the side of the message producer before transmitting the message over to the message queuing system. (e.g. a decryption of the message—depending upon permission—may then only be decrypted on the consumer side so the message can never remain unencrypted all the way from the message producer to the message receiver); (vi) the message may be stored as a topic-related message in the message queuing system such that there may be topics requiring encryption in the database of the message queuing system and other topics that cannot require any encryption; and/or (vii) the producer of the message and/or the encryption database system key user may stay in complete control of the encryption/decryption process so that the encryption is not delegated to the operator of the message queuing system operator (e.g., a standard message queuing system—like Kafka—may be used and—at the same time—encryption of messages in topics may be guaranteed).

In the following, a detailed description of the figures will be given. All instructions in the figures are schematic. Firstly, a block diagram of an embodiment of the inventive computer-implemented method for a targeted, policy-based encryption in a publish-subscribe messaging queue is given.

Afterwards, further embodiments, as well as embodiments of the system for a targeted, policy-based encryption in a publish-subscribe messaging queue, will be described.

FIG. 1 is a flowchart of first-embodiment method 100 for a targeted, in particular targeted on a topic level, policy-based encryption in a publish-subscribe message queue. The message queue may be implemented using a Kafka system or another now-known or to-be-developed messaging system. The method comprises receiving, 102, an encrypted message by a message queuing system. Thereby, the message has been encrypted—in particular by a message producer or a related message producing system by referring to an encryption policy system and a key management system storing a topic-related encryption key. Alternatively, the policy-based encryption is targeted on a class level.

The method 100 comprises also storing, 104, the received topic-related encrypted message, and sending, 106, in particular on request of a message consumer in a publish/subscribe manner, the encrypted message based on a subscription to the topic of which the message is related. Alternatively, the notion of message class is the bases for organizing the messages and for subscriptions. In this disclosure, the term class involves characteristics that may not be readily understood as topics, such as urgency of messages, classified status, and level of insightfulness.

FIG. 2 is a schematic view of first-embodiment system 200 supporting the first-embodiment method of FIG. 1. Message producer 202 refers to an encryption policy of encryption policy system 210 for determining whether a message regarding a specific topic has to be encrypted. Message producer 202 receives an encryption key for the message, whether in parallel or on request, from key management system 212 where the key management system authorizes access via access control module 213. In this example, the message producer may interact with key management system using key management API (application programming interface) 214. The key management system and the encryption policy system record key access transactions and policy changes to logging system 216 via access control modules 211 and 213. Recordation may include requests received, acceptance, denial, corresponding time stamps, authorization levels, topics searched, and/or keys provided. The key management system may also manage access control to specific topics for producers and consumers. The message (not shown) is then sent in a particular encrypted form, being encrypted by encryption interface 203 of message producer 204, to message broker 204 for storing the message in encrypted form as a specified topic or class in file system 206. In some embodiments of the present invention, file system 206 is in the form of a Kafka cluster. In some embodiments of the present invention, the encryption and decryption is performed at the broker level, for example, within broker 204, so that key access is consolidated at the broker. In a publish/subscribe mode, broker 204 sends an encrypted message relating to the topic, which is subscribed to by consumer 208, to the consumer. Responsive to receiving the message, consumer 208 checks with encryption policy system 210 to determine whether the message relating to the subscribed topic is encrypted. If encrypted, the consumer receives on request a decryption key relating to the above-mentioned encryption key, where the request is made using the subscribed topic as the input parameter for key management system 212. It may be noted that the encryption/decryption can be symmetric (encryption and decryption key are identical) or asymmetric (encryption and decryption key on different, e.g., like in a public key infrastructure). The encryption/decryption mechanism may comply with the AES-256 Advanced Security Standard or the key(s) may be compatible with any other suitable encryption standard. In some embodiments of the present invention, the broker is the message queuing system. In some embodiments of the present invention, the key management system is operated as a key management service.

Upon receipt of the decryption key, the message consumer decrypts the received message (not shown) using the decryption interface 209 of message consumer 208 and the received decryption key (not shown).

FIG. 3 is a flowchart of process 300 including activities to implement at least portions of the first-embodiment method using the first-embodiment system of FIG. 2. In an initial step 302 the message producer or, simply, producer prepares to send a message assigned the subscribed topic to file system 206 via broker 204. Prior to transmission, the producer consults, 304, encryption policy system 210 with the subscribed topic as input variable. In this example, it turns out that the subscribed topic requires encryption according to the encryption policy system or database. The producer then requests the encryption key referred to in the encryption policy from key management system 212. Assuming the access control policy at the key management service permits access to the key for the producer—i.e., the producer is allowed to send a message to the specified topic to the file system—the key is returned by the key management service in the request response to the producer.

At the same time, the key request by the producer is logged in an audit trail in logging system 216.

Next, 306, the producer encrypts the outgoing message body using the key retrieved from the key management system and the message is sent to file system 206 under the specified topic via broker 204. The broker receives, 308, the message and stores the message in the targeted topic of the file system in an encrypted form.

Then, the broker receives a request from a consumer, 310, regarding messages of a specified topic. The consumer request is stored in a message logging system such as logging system 216. The logging system is associated with key management system 212 by access control module 213 and encryption policy system 210 by access control module 211 as a single system such that policy and access are tracked within the same system. Alternatively, separate logging systems may be associated with the two systems. The broker responds to the request by sending the message received from the producer in step 308. At step 314, the consumer receives the message assigned the specified topic in encrypted form.

Then, the consumer checks or consults, 316, the encryption policy database system to determine whether the message relating to the topic is encrypted and, if so, requests from the key management system the key required to decrypt the message. After the consumer has received, 318, the decryption key from the key management system, the consumer system decrypts the received message. Upfront, at the key management system or the encryption policy system, it has been verified that the consumer, according to the access control policy, is allowed to receive the decryption key. It should be noted that the requesting consumers are banned from the respective audit service, activity tracker, logging system, and/or ordered trail. Finally, the consumer decrypts the message using the key received from the key management system.

For completeness reasons, FIG. 4 is a schematic view of a machine logic (for example, software) portion 400 of the first-embodiment system for a targeted, policy-based encryption in a publish/subscribe message queue. The machine logic portion comprises a message queueing system 402 adapted for receiving an encrypted message, wherein the message has been encrypted by referring to an encryption policy system 404 and a key management system 406 storing a topic-related encryption key. Further, the message may be encrypted by an encryption system of a producer, such as encryption system 410.

The machine logic portion may also comprise a means for storing in database 408 the received topic-related encrypted message, i.e., one group of messages may be stored under one topic or related to one topic, and another group may be stored in another topic or related to another topic. Database 408 may be linked to the message queueing system 402 or may be a physical part of it.

Finally, the machine logic portion comprises a means for sending the encrypted message to a consumer based on a subscription to the assigned topic of the message. The sending may be directed to a message receiver (not shown here) instrumented with a decryption system, such as decryption system 412.

Some embodiments of the present invention may include one, or more, of the following features, characteristics and/or advantages: (i) the message queueing system may be a Kafka system, in particular of version 0.9.0 or higher and any other message queueing system may be deployed when practicing various embodiments of the present invention; (ii) methods of the present invention may be agnostic to the underlying message queuing system; (iii) the method may also comprise referring, by a message producer, to the encryption policy system before sending the topic-related message such that the message producer may determine whether an encryption for the message relating to a specific topic should be encrypted before sending it to the message queuing system; (iv) the method may include upon determining, by the message producer, that the encryption policy database comprises a rule enforcing encryption of the topic-related message—i.e., based on a selected topic—receiving an encryption key from the key management system if the message producer is permitted to receive the encryption key where the encryption key may have been requested by the message producer from the key management system (e.g., using a secure access method); (v) the key management system and the encryption policy system may be implemented in a same security system (e.g., the key management system may be a service of the encryption policy system such that a central control—in particular outside the control of the message queuing system operator—of the security rules and the related key for encryption and decryption may be provided); and/or (vi) the key management system and the encryption policy system may be accessible at different locations (e.g., the encryption database system and key management system may be implemented independently from each other so that the security architecture may increase the provided security level even more) (It may be noted that for accessing the encryption database system and key management system different authentication methods may have to be used).

Some embodiments of the present invention may include one, or more, of the following features, characteristics and/or advantages: (i) an operation where upon receiving, by a message consumer, a sent message—in particular sent from the message queuing system—referring to the encryption policy system and determining whether the received message has been encrypted where the message consumer may be enabled to differentiate between encrypted and unencrypted messages from the message queuing system and the message receiver may not be enabled to treat them differently; (ii) an operation where upon determining that the received message is encrypted, receiving—in particular after a related request—by the message consumer—in particular, from the key management system—a decryption key where the decryption key should be related to the encryption key the message has been encrypted with and because the keys may be stored by topic, the message receiver may request the decryption key by referring to the topic and then the message receiver may decrypt the received message using the received decryption key; (iii) the encryption/decryption key(s) may be used for a symmetrical encryption or an asymmetrical encryption; (iv) an operation logging accesses to the encryption policy system; (v) an operation logging accesses to the key management system such that a secure audit trail may be established for the encryption policy system, as well as for the key management system and all accesses, key retrievals, and changes may be traceable at any point in time including access attempts of unauthorized users or systems; (vi) all accesses, key retrievals, and changes may be tracked whether a message sent to the message consumer has been decrypted (e.g., made readable by a specific, identifiable user); (vii) the received encrypted message, by a message queueing system, may be digitally signed; and/or (viii) the received encrypted message by a message queueing system comprises a message authentication code, in particular an HMAC (keyed-Hash Message Authentication Code) to assure the integrity of the signer of the encrypted message, as well as the integrity of the message (e.g., it may be proven that no bit has been changed on the way from the message producer to the message consumer).

FIG. 5 shows flowchart 600 depicting a second method according to the present invention.

Processing begins at step S602, where a key management system determines a first encryption level. The encryption level refers to a type and/or degree of encryption. Encryption levels are provided on a topic-based list according to an encryption policy. Messages are encrypted according to the associated topic of the message.

Processing proceeds to step S604, where the key management system provides an encryption key to a user who wants to store the message in a file system of a message queuing system such as Kafka. In some embodiments of the present invention key access is controlled such that the user must be authenticated before the key is provided.

Processing proceeds to step S606, where the key management system stored an encrypted message. The user encrypts the message associated with a given topic and provides the encrypted message to a broker for storage of the encrypted message in the file system of a message queuing system.

Processing proceeds to step S608, where the key management system receives a request for the encrypted message. Consumers may subscribe to the message queuing system and select certain topics of interest. When a message is stored that is associated with a subscribed topic, the consumer may request the message. In some embodiments of the present invention, the consumer receives notice of the message on a particular topic and submits a request after the notice. Alternatively, a request is automatically generated for each consumer having subscribed to the particular topic.

Processing proceeds to step S610, where the key management system identifies a decryption key corresponding the encrypted message. Decryption keys are stored according to topic such that for a given message on a particular topic, the decryption key may be identified via the encryption policy system.

Processing ends at step S612, where the key management system sends the consumer the encrypted message and the corresponding decryption key. In some embodiments of the present invention, the encrypted message is sent to the consumer and, upon determining that a decryption key is needed, the decryption key is sent to the consumer. Alternatively, the consumer receives the encrypted message and requests a decryption key to decrypt the message.

Embodiments of the invention may be implemented together with virtually any type of computer, regardless of the platform being suitable for storing and/or executing program code. FIG. 6 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 is a communications fabric representing one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, at least portions of the system 400 for a targeted, policy-based encryption in a publish-subscribe messaging queue may be attached to the bus system 506. The complete system 400 may require a plurality of different computing systems 500 for different portions of the system, e.g., a message producer system, a message receiver system, a database system, the core message queuing system, the key management system and the encryption policy system.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine-readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Some embodiments of the present invention are directed to one or more of the inventive concepts that follow.

A computer-implemented method for a targeted, policy-based encryption in a publish-subscribe messaging queue, the method comprising (i) receiving an encrypted message by a message queueing system, wherein the message has been encrypted by referring to an encryption policy system and a key management system storing a topic-related encryption key; (ii) storing the received encrypted message; and (iii) sending the encrypted message based on a subscription to the topic.

A message queueing system that is a Kafka system.

A targeted, policy-based encryption in a publish-subscribe messaging queue including an operation referring, by a message producer, to the encryption policy system before sending the topic-related message.

A targeted, policy-based encryption in a publish-subscribe messaging queue including an operation determining, by a message producer, that the encryption policy database comprises a rule enforcing encryption of the topic-related message and receiving an encryption key from the key management system if the message producer is permitted to receive the encryption key.

A key management system and an encryption policy system that are implemented in a same security system.

A key management system and an encryption policy system that are accessible at different locations.

A targeted, policy-based encryption in a publish-subscribe messaging queue including an operation upon receiving, by a message consumer, a sent message, referring to the encryption policy system and determining whether the received message is encrypted.

A targeted, policy-based encryption in a publish-subscribe messaging queue including the operations: (i) upon determining that the received message is encrypted, receiving, by the message consumer, a decryption key; and (ii) decrypting the received message.

A targeted, policy-based encryption in a publish-subscribe messaging queue including an operation logging accesses to the encryption policy system.

A targeted, policy-based encryption in a publish-subscribe messaging queue including an operation logging accesses to the key management system.

An encrypted message received by a message queueing system is digitally signed.

An encrypted message received by a message queueing system includes a message authentication code.

A computer system for a targeted, policy-based encryption in a publish-subscribe messaging queue, the computer system comprising: (i) a message queueing system adapted for receiving an encrypted message, wherein the message has been encrypted by referring to an encryption policy system and a key management system storing a topic-related encryption key; (ii) a means for storing the received encrypted message; and (iii) a means for sending the encrypted message based on a subscription to the topic.

A computer system for a targeted, policy-based encryption in a publish-subscribe messaging queue wherein a message producer is adapted for: upon determining, by that the encryption policy database comprises a rule enforcing encryption of the topic-related message, receiving an encryption key from the key management system if the message producer is permitted to receive the encryption key.

What is claimed is:

1. A computer-implemented method comprising:
receiving, from a first entity, a publication request to determine whether a first topic requires encryption for storage in a message queuing system, the first topic being associated with a first message;
responsive to receiving the publication request, determining the first topic requires a first encryption level for storage in a message queuing system according to a topic-based encryption policy;
providing to the first entity an encryption key for encrypting the first message according to the first encryption level to produce a first encrypted message;
storing the first encrypted message in the message queuing system according to the first topic;
receiving from a second entity a topic request for messages associated with the first topic including the first encrypted message;
identifying a decryption key corresponding to the first encrypted message associated with the first topic according to the topic-based encryption policy; and
sending to the second entity the first encrypted message for decryption by the second entity using the decryption key;
wherein:
the encrypted message is stored with a message authentication code, the second entity being required to provide the message authentication code to receive the encrypted message responsive to the request for messages associated with the first topic.

2. The computer-implemented method of claim 1, further comprising:
recording to a logging system the providing to the first entity the encryption key for producing the first encrypted message and the sending to the second entity the decryption key for the first encrypted message.

3. The computer-implemented method of claim 2, further comprising:
responsive to an update to the topic-based encryption policy, recording the update to the logging system.

4. The computer-implemented method of claim 1, further comprising:
establishing a subscription account for the second entity including assigning authenticating credentials to the second entity; and
the topic request is received when the second entity subscribes to the first topic via the subscription account.

5. The computer-implemented method of claim 1, wherein the decryption key is assigned to the first topic by the topic-based encryption policy.

6. A computer program product comprising a computer-readable storage medium having a set of instructions stored therein which, when executed by a processor, causes the processor to perform a topic-based encryption in a publish-subscribe messaging queue by:
receiving, from a first entity, a publication request to determine whether a first topic requires encryption for storage in a message queuing system, the first topic being associated with a first message;
responsive to receiving the publication request, determining the first topic requires a first encryption level for storage in a message queuing system according to a topic-based encryption policy;

providing to the first entity an encryption key for encrypting the first message according to the first encryption level to produce a first encrypted message;
storing the first encrypted message in the message queuing system according to the first topic;
receiving from a second entity a topic request for messages associated with the first topic including the first encrypted message;
identifying a decryption key corresponding to the first encrypted message associated with the first topic according to the topic-based encryption policy; and
sending to the second entity the first encrypted message for decryption by the second entity using the decryption key;
wherein:
the encrypted message is stored with a message authentication code, the second entity being required to provide the message authentication code to receive the encrypted message responsive to the request for messages associated with the first topic.

7. The computer program product of claim 6, further causing the processor to perform a topic-based encryption in a publish-subscribe messaging queue by:
recording to a logging system the providing to the first entity the encryption key for producing the first encrypted message and the sending to the second entity the decryption key for the first encrypted message.

8. The computer program product of claim 7, further causing the processor to perform a topic-based encryption in a publish-subscribe messaging queue by:
responsive to an update to the topic-based encryption policy, recording the update to the logging system.

9. The computer program product of claim 6, further causing the processor to perform a topic-based encryption in a publish-subscribe messaging queue by:
establishing a subscription account for the second entity including assigning authenticating credentials to the second entity; and
the topic request is received when the second entity subscribes to the first topic via the subscription account.

10. The computer program product of claim 6, wherein the decryption key is assigned to the first topic by the topic-based encryption policy.

11. A computer system comprising:
a processor set; and
a computer readable storage medium having program instructions stored therein;
wherein:
the processor set executes the program instructions that cause the processor set to perform a topic-based encryption in a publish-subscribe messaging queue by:
receiving, from a first entity, a publication request to determine whether a first topic requires encryption for storage in a message queuing system, the first topic being associated with a first message;
responsive to receiving the publication request, determining the first topic requires a first encryption level for storage in a message queuing system according to a topic-based encryption policy;
providing to the first entity an encryption key for encrypting the first message according to the first encryption level to produce a first encrypted message;
storing the first encrypted message in the message queuing system according to the first topic;
receiving from a second entity a topic request for messages associated with the first topic including the first encrypted message;
identifying a decryption key corresponding to the first encrypted message associated with the first topic according to the topic-based encryption policy; and
sending to the second entity the first encrypted message for decryption by the second entity using the decryption key;
wherein:
the encrypted message is stored with a message authentication code, the second entity being required to provide the message authentication code to receive the encrypted message responsive to the request for messages associated with the first topic.

12. The computer system of claim 11, further causing the processor set to perform a topic-based encryption in a publish-subscribe messaging queue by:
recording to a logging system the providing to the first entity the encryption key for producing the first encrypted message and the sending to the second entity the decryption key for the first encrypted message.

13. The computer system of claim 12, further causing the processor to perform a topic-based encryption in a publish-subscribe messaging queue by:
responsive to an update to the topic-based encryption policy, recording the update to the logging system.

14. The computer system of claim 11, further causing the processor to perform a topic-based encryption in a publish-subscribe messaging queue by:
establishing a subscription account for the second entity including assigning authenticating credentials to the second entity; and
the topic request is received when the second entity subscribes to the first topic via the subscription account.

15. The computer system of claim 11, wherein the decryption key is assigned to the first topic by the topic-based encryption policy.

16. A computer-implemented method comprising:
determining, by a producer, a first topic associated with a first message requires a first encryption level by reference to a topic-based encryption policy;
encrypting, by the producer, the first message according to the first encryption level to produce an encrypted message;
storing the encrypted message in a message queuing system according to the first topic;
receiving from a consumer a subscription for messages associated with the first topic including the first message;
identifying, by the consumer, a decryption key corresponding to the encrypted message according to the topic-based encryption policy with reference to the first topic; and
decrypting, by the consumer, the encrypted message with the decryption key to reproduce the first message;
wherein:
the encrypted message includes a message authentication code; and
the subscription for messages includes the encrypted message only when the message authentication code is provided by the consumer.

17. The computer-implemented method of claim 16, further comprising:
receiving the first message associated with the first topic from the producer.

18. The computer-implemented method of claim 16, wherein the message queueing system is a Kafka system.

19. The computer-implemented method of claim 16, wherein identifying the decryption key includes:
- referring to the topic-based encryption policy to determine whether the subscription for messages associated with the first topic includes encrypted messages.

* * * * *